US005422629A

United States Patent [19]

Minnis

[11] Patent Number: 5,422,629

[45] Date of Patent: Jun. 6, 1995

[54] ALARM SILENCING CIRCUITRY FOR PHOTOELECTRIC SMOKE DETECTORS

[75] Inventor: David A. Minnis, Montgomery, Ill.

[73] Assignee: BRK Brands, Inc., Del.

[21] Appl. No.: 860,452

[22] Filed: Mar. 3, 1992

[51] Int. Cl.[6] .......... G03B 17/10

[52] U.S. Cl. .......... 340/630; 340/628

[58] Field of Search .......... 340/628, 629, 630, 632, 340/501, 511, 512, 514; 356/438; 250/564, 573, 574

[56] References Cited

U.S. PATENT DOCUMENTS

| | | | |
|---|---|---|---|
| 4,101,785 | 7/1978 | Malinowski | 340/630 X |
| 4,313,110 | 1/1982 | Subulak et al. | 340/527 |
| 4,321,466 | 3/1982 | Mallory et al. | 340/630 X |
| 4,477,798 | 10/1984 | Saul et al. | 340/527 |
| 4,567,477 | 1/1986 | Cormier | 340/644 |
| 4,792,797 | 12/1988 | Tanguay et al. | 340/628 |
| 4,814,748 | 3/1989 | Todd . | |
| 4,827,244 | 5/1989 | Bellavia et al. | 340/514 |

OTHER PUBLICATIONS

BRK Electronics, a Division of Pitway Corporation, Smoke Alarm Detector Model SA88, Schematic of CIrcuitry (1 p.).

Firenetics Inc., LIFESAVER© Owner's Manual, Model 0906, Sep. 1986 ( 3 pages).

*Primary Examiner*—Jeffery A. Hofsass

*Attorney, Agent, or Firm*—Dressler, Goldsmith, Shore & Milnamow, Ltd.

[57] ABSTRACT

A silencable photoelectric-type detector includes a source of radiant energy and a detector. A generator circuit provides a sequence of pulses to energize the source. A biasing circuit biases the detector. The detector can be temporarily silenced, when in alarm, by reducing the energy level of the pulses or altering the bias point of the detector for a period of time. The period of time can be established by an RC circuit. The effect of the energy level reduction or the bias point alteration is to reduce the sensitivity level of the detector temporarily.

6 Claims, 6 Drawing Sheets

ALARM SILENCING CIRCUITRY FOR PHOTOELECTRIC SMOKE DETECTORS

FIELD OF THE INVENTION

The invention pertains to photoelectric-type condition detectors. More particularly, the invention pertains to photoelectric-type smoke detectors which can be temporarily silenced if an inappropriate alarm is generated.

BACKGROUND OF THE INVENTION

Smoke detectors have been recognized as useful products in providing an early warning where ambient smoke increases to an undesirable level. When the predetermined level of smoke has been sensed, the detectors generate an audible or a visual alarm.

Two types of detectors are available in the retail market. One type is a so-called ion type. A second is a photoelectric type.

It has also been recognized that at times, particularly around kitchens, the ambient smoke level can increase in the absence of a dangerous fire condition. This can occur where cooking oils, for example, are temporarily overheated producing a level of smoke which will cause a nearby detector to go into alarm.

These nuisance alarms are an aggravation and are undesirable. It has also been known in the prior art ion-type detectors to provide a silencing feature which can be activated to temporarily silence the detector.

Such silencing features can be activated by a push button, for example, and can cause the unit to go out of alarm relatively quickly, for a predetermined period of time, such as ten to fifteen minutes. During this period of time, the smoke condition will usually dissipate, and at the end of the silencing period when the detector again becomes active, it will normally not go back into alarm.

One known silencing system is disclosed in Bellavia, et al. U.S. Pat. No. 4,901,056 assigned to the assignee of the present invention.

Structures of known photoelectric detectors are disclosed in Dederich, et al. U.S. Pat. No. 4,539,556, and Keeler U.S. Pat. No. 4,626,695, both of which are assigned to the assignee of the present invention. The disclosure and figures of the Dederich, et al. and Keeler patents are incorporated herein by reference.

There continues to be a need for inexpensive and effective circuitry which can ben used to silence photoelectric detectors in the event of nuisance alarms. Preferably, such circuitry would include a fairly limited number of additional low cost components beyond those components needed to implement the detector circuitry.

SUMMARY OF THE INVENTION

Silencing circuitry is provided for use with a photoelectric-type condition sensing unit. In one embodiment of the invention, the silencing circuitry, when activated, alters a bias condition of a sensor in the detector. The sensitivity of the unit is thereby reduced.

In a second disclosed embodiment, a level of energy of pulses provided to a source of radiant energy in the unit is reduced by the silencing circuitry. The sensitivity of the unit is thereby reduced.

In the bias altering embodiment of the invention, a switching amplifier is coupled to the biasing circuitry for the radiant energy sensing element. By turning on the switching element, in response to a desire to silence the unit, the bias point of the sensor can be altered.

The period of silence can be set by means of a resistor-capacitor (RC) circuit, which is initially charged up to turn on the bias altering switching element. The RC circuit keeps that element turned on until the associated capacitor discharges to a predetermined level. At that point the switching element turns off and the bias for the unit returns to its normal, higher, sensitivity.

In the second embodiment of the invention, a pulse source provides pulses of electrical energy to a source of radiant energy, such as a light-emitting diode. The energized light-emitting diode emits radiant energy at a predetermined level, thereby establishing a sensitivity level for the unit.

Silencing circuitry, coupled to the pulse generator circuitry, when activated, reduces the energy level of pulses provided to the radiant energy source. Thus, the resultant level of pulsed radiant energy is reduced. As such, the sensitivity level of the detector is decreased.

An RC circuit can be charged up and used for the purpose of establishing the duration of the period of reduced sensitivity. When the capacitor discharges sufficiently to a predetermined level, the energy reduction circuitry ceases to affect the pulse generator. The level of energy of the pulses supplied to the radiant energy source then increases to its initial level thereby returning the unit to its higher sensitivity condition.

These and other aspects and attributes of the present invention will become increasingly clear upon reference to the following drawings and accompanying specification.

DETAILED DESCRIPTION OF THE PREFERRED EMBODIMENTS

Figure 1:
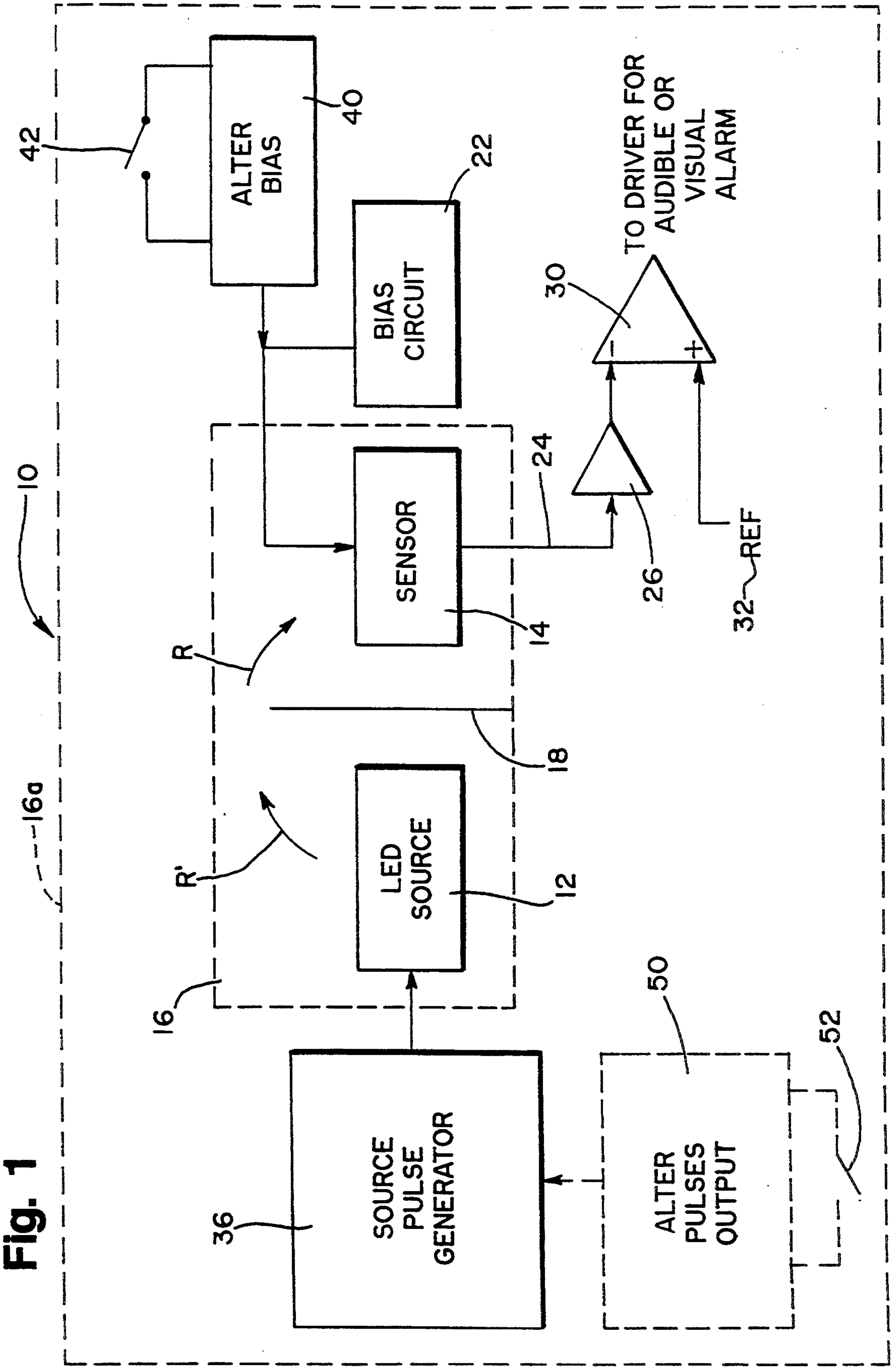
FIG. 1 is an overall block diagram of a photoelectric-type detector illustrating first and second embodiments of silencing circuitry in accordance with present invention.

While this invention is susceptible of embodiment in many different forms, there is shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a photoelectric sensing unit 10 which includes a source of radiant energy, such as a light-emitting diode 12, and a sensor of radiant energy, such a photo diode 14. Where the unit 10 is a photoelectric smoke detector the source 12 and the sensor 14 can be mechanically supported in a chamber 16 in a conventional fashion. In the chamber 16 the source 12 is optically isolated from the sensor 14 by a conventional baffle or other structure 18. The elements of the unit 10 can be carried by a housing 16*a*, illustrated in phantom in FIG. 1.

In a first embodiment of the invention the sensor 14 is biased to a predetermined operating point by bias circuitry 22. As a result of bias circuitry 22, reflected incident radiant energy R which falls on the sensor 14 generates a known output electrical signal from the sensor 14 on a line 24. This signal can be amplified in an amplifier 26 and compared in a comparator 30 to a reference 32. If the electrical signal output from the sensor 14 exceeds the predetermined reference 32, an alarm condition can be indicated either audibly or visually.

The structure of the chamber 16 is such that for a given level of ambient smoke, a known level of radiant energy R will be reflected onto the sensor 14. As is well known, as the level of smoke in the chamber 16 increases, the degree of reflection of the radiant energy R onto the sensor 14 also increases. As a result, the electrical signal on the line 24 provides a direct indication of the level of ambient smoke in the chamber 16.

Reflected radiant energy R is available to impinge upon sensor 14 because the source 12 is energized with a series of pulses from a pulse generator 36. The level of energy associated with each of the pulses from the generator 36 produces an output pulse of radiant energy R′ from the source 12.

Bias altering circuitry 40 is coupled to bias establishing circuitry 42. To activate the silence mode for the detector 10, a switch 42 can be momentarily closed.

The bias altering circuitry 40, in response to the momentary closure of the switch 42, changes the bias current to the sensor 14, thereby shifting it to a region such that for a given level of incident radiant energy R, a smaller signal is generated on the line 24. As a result, the sensitivity of the unit 10 will be reduced.

The bias altering circuitry 40 can include timing circuitry, such as a resistor-capacitor combination, for the purpose of temporarily establishing an altered bias point. At the end of a predetermined period of time, the bias altering circuitry returns to its initial state and the sensor 14 returns to its initial bias point.

FIG. 1 also illustrates in phantom an alternate circuit 50 for implementing a silencing function. The circuit 50 could be used in lieu of the bias altering circuitry 40.

Circuitry 50 alters an energy level of the pulses provided by the generator 36 to the radiant energy source 12. In response to a momentary closure of a switch 52, pulse altering circuitry 50 reduces the level of energy in the pulses provided by the generator 36 to the source 12. Hence, the radiant energy R′ emitted therefrom is reduced. As a result, the reflected radiant energy R incident on the sensor 14 is also reduced. The unit 10 thus has a lower sensitivity.

The pulse altering circuitry 50 can also include timing circuitry, such as a resistor-capacitor network, for establishing a predetermined period of time in which the energy level of the pulses provided to the source 12 is reduced. At the end of that period of time, the energy level of the pulses to the source 12 reverts to an initial higher state thereby increasing the output intensity of the radiant energy R prime. The detector 10 then returns to its normal level of sensitivity.

It will be understood that the switches 42 and 52 need not be manually operable switches. For example, the above-noted Bellavia, et al. U.S. Pat. No. 4,901,056 discloses and describes a system wherein a silencing function can be initiated at a distance by a user using a hand-held source of radiant energy, such as a flashlight. Such forms of initiating the above-described silence function from a distance using either of the described embodiments are within the spirit and scope of the present invention.

Figure 2:
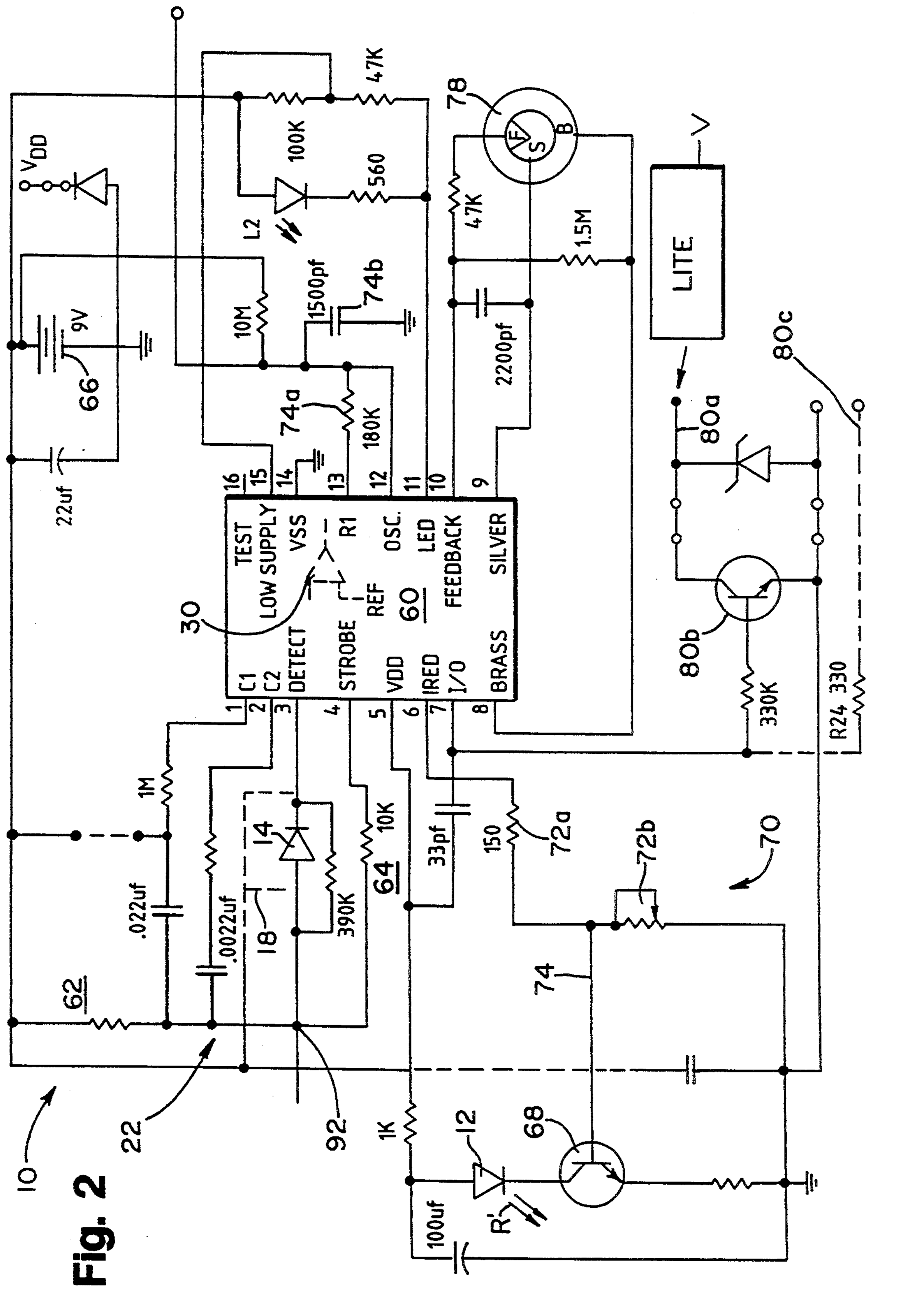
FIG. 2 is a schematic diagram of a photodetector.

FIG. 2 is a schematic diagram of an exemplary photodetector 10. The elements of the detector 10 of FIG. 2 which were previously identified in FIG. 1, bear the same identification numerals.

The detector 10 includes an integrated circuit 60. The integrated circuit 60 can be a commercially available product, such as the Motorola MC145010 Integrated Circuit.

Coupled to the detect input, PIN 3, of the integrated circuit 60, is the photodiode or photosensor 14. The sensor 14 is biased by the bias circuitry 22, which includes resistors 62 and 64. Resistor 62 is in turn coupled directly to a battery 66, which powers the unit 10.

The source 12, an infrared light emitting diode, for example, is coupled to the source pulse generator 36. The source pulse generator 36 includes a switching element 68 and a resistor 68*a*.

The switching element 68, when conducting, permits a current to flow through the source 12, thereby generating radiant energy. The amplitude of the current through the source 12 is controlled by the extent to which the switching element 68 is turned on or conducting.

The switching element 68 is in turn, controlled by means of a source bias circuit 70. The source bias circuit 70 includes first and second series coupled resistors 72*a* and 72*b*.

The source bias circuit provides current on a line 74 to the switching element 68 for purposes of causing same to conduct, thereby applying electrical energy to the light-emitting diode source 12. The higher the current amplitude is on the line 74, the more that transistor 68 conducts. This in turn increases the level of energy being applied to the radiant energy source 12.

The source bias circuit 70 is controlled by the integrated circuit 60, output PIN 6, thereof. PIN 6 provides pulsed bias current, which can be used to drive the switching element 68.

The width of the pulse produced at output PIN 6 of integrated circuit 60 is determined by the magnitude of a timing resistor 74*a* and a capacitor 74*b*. For the illustrated values, the nominal output pulse width from PIN 6 is on the order of 190–200 microseconds.

During the 200 microsecond pulse period, current on the line 74 causes the switching element 68 to conduct, thereby providing a pulse of electrical energy to the source 12. This pulse is in turn converted into a corresponding degree of radiant energy R′. Depending on the level of current in the line 74, the degree of electrical energy provided to the source 12 can be increased or decreased.

If the level of current in the line 74 is decreased, the level of output radiant energy R′ from the source 12, will be decreased, thereby reducing the sensitivity of the unit 10. If the current in the line 74 is increased, the level of output radiant energy R′ from the source 12 is increased, thereby increasing the sensitivity of the unit.

The unit 10 also includes a conventional piezoelectric horn 78 to generate an audible alarm in the event that the level of detected smoke, proportional to the radiant energy R, which falls upon the sensor 14, exceeds a predetermined level.

In the event that it is desirable to be able to couple an external unit, such as a light or the like, to the detector 10, an output port 80*a*, along with a related switching element 80*b* are provided. In addition, if it is desirable to couple a plurality of units, corresponding to the unit 10, together, a further output port 80*c* is provided. Units can be coupled together at the port 80*c*.

Figure 3:
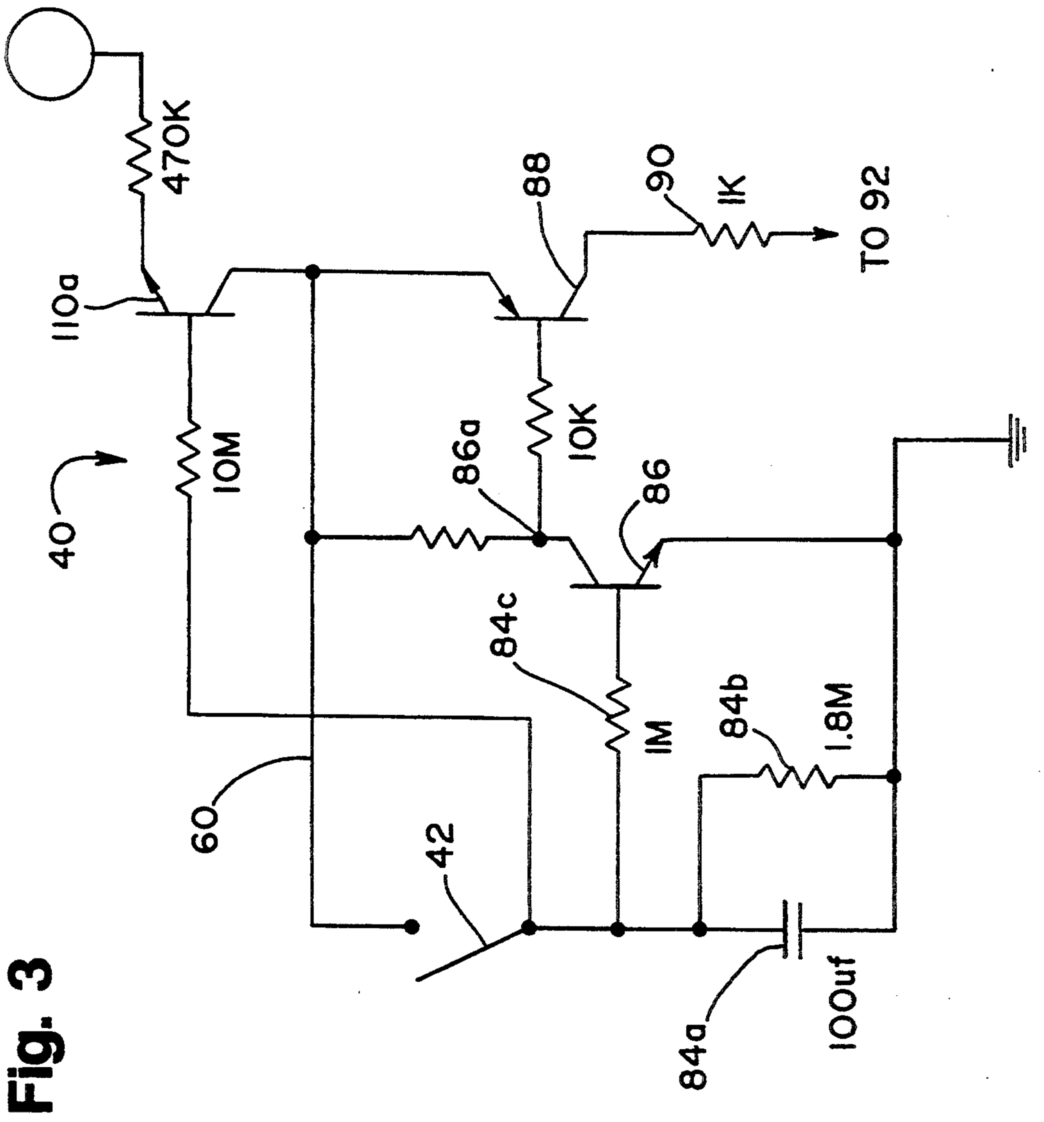
FIG. 3 is a schematic diagram of bias altering silencing circuitry usable with the detector of FIG. 2 in accordance with the present invention.

FIG. 3 is a schematic diagram of the bias altering circuitry 40. The bias altering circuitry 40 would be carried on the housing 16*a*, along with the rest of the detector 10 and powered off of the battery 66.

The bias altering circuitry 40 includes a manually operable silencing switch 42. The switch 42 is coupled to an RC time constant circuit, having a capacitor 84*a* and a resistor 84*b*. The switch 42 is also coupled via a limiting resistor 84*c* to switching transistor 86.

The transistor 86 is in turn coupled to a further switching transistor 88. The transistor 88 is in turn coupled via a limiting resistor 90 and node 92 (see FIG. 2) to the bias circuitry 22.

When the switch 42 is closed, resistor capacitor combination 84*a*, 84*b* is charged up. Simultaneously, transistor 86 is turned on, as is transistor 88. This in turn, raises the voltage at node 92, thereby altering the bias of element 14 and reducing the sensitivity of the unit 10. Point "B" of FIG. 3 is electrically connected to Point "B" of FIG. 2.

Figure 4:
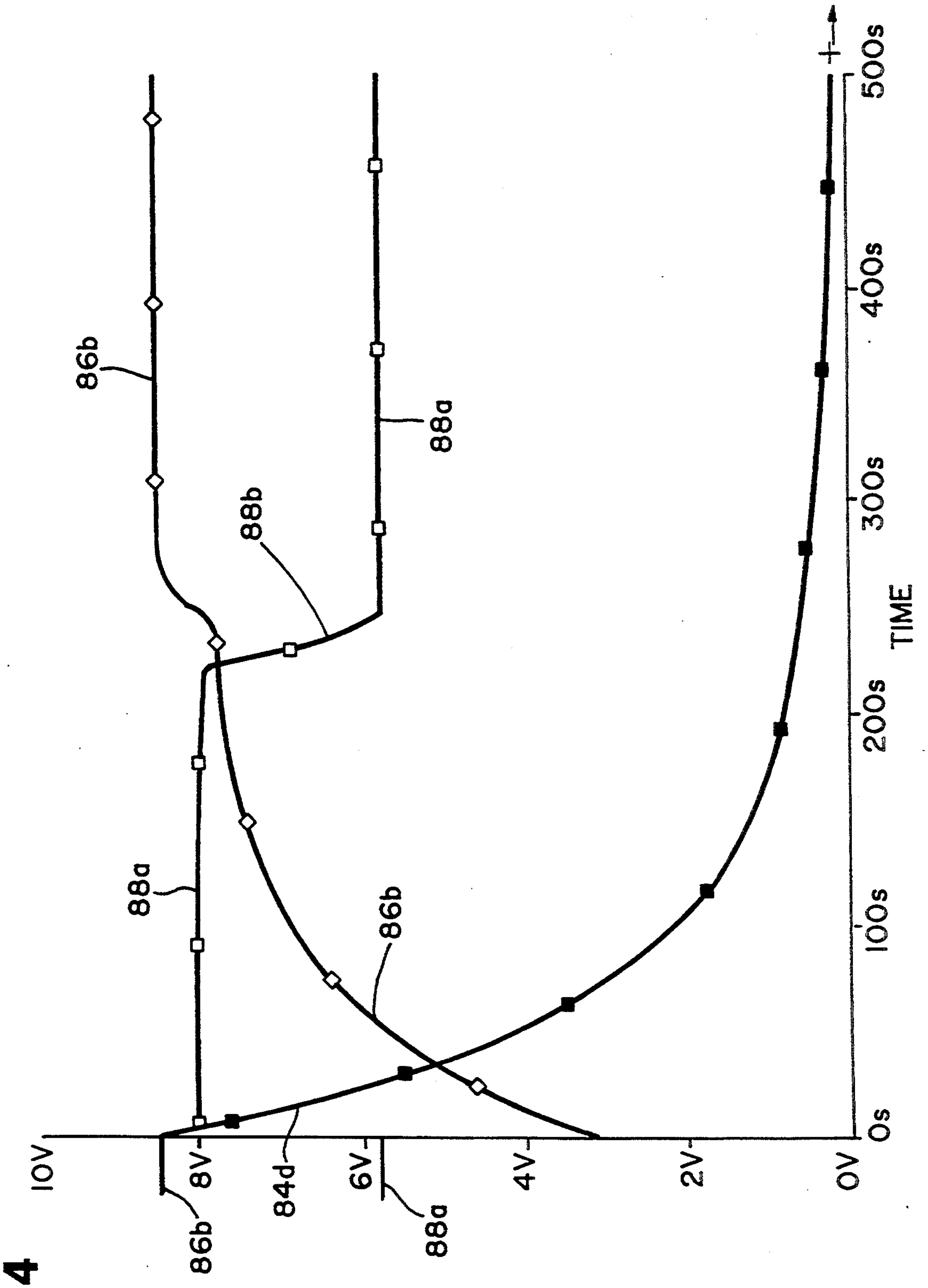
FIG. 4 is a graph of selected waveforms from the circuitry of FIG. 3.

A diagram, FIG. 4, illustrates various waveforms of the bias altering circuitry 40, plotted as a function of time. In the waveforms of FIG. 4, the switch 42 is closed at zero seconds.

On closure of the switch 42, a voltage 84*d* across the resistor capacitor combination 84*a*, 84*b*, increases from a low value, near zero volts, to a maximum and then decays exponentially as illustrated. Simultaneously with the voltage 84*d*, increasing to a maximum, the transistor 86 starts to conduct and the voltage at the collector 86*a* thereof, illustrated as waveform 86*b* in FIG. 4, drops substantially to about three volts, thereby causing the switching transistor 88 to conduct. The voltage 86*b* increases in response to the voltage across the resistor capacitor combination 84*a*, 84*b*, decreasing.

The voltage at the node 92, illustrated as waveform 88*a* in FIG. 4, increases from a value slightly less than 6 volts to a value on the order of 8 volts, immediately after the switch 42 has been closed. This is in response to the transistor 88 conducting.

During the time that the voltage 84*d* is high, and the transistor 88 is conducting, the voltage 88*a* at the node 92 stays high and is substantially constant. During this time interval, the bias of the sensor 14 has been changed and the unit 10, as a result is less sensitive. When the voltage 84*d* declines sufficiently, after about 220 seconds, the voltage 88*a* at the node 92 drops to its original value in response to the transistor 88 turning off again.

In a region 88*b* the transistor 88 is in the process of turning off. The reduced sensitivity time period for the unit 10, utilizing the circuit 40, is on the order of 220 seconds.

At the end of the reduced sensitivity time period, the voltage 88*a* returns to its steady state value, slightly less than 6 volts. The detector at that time, has returned to its normal sensitivity.

Figure 5:
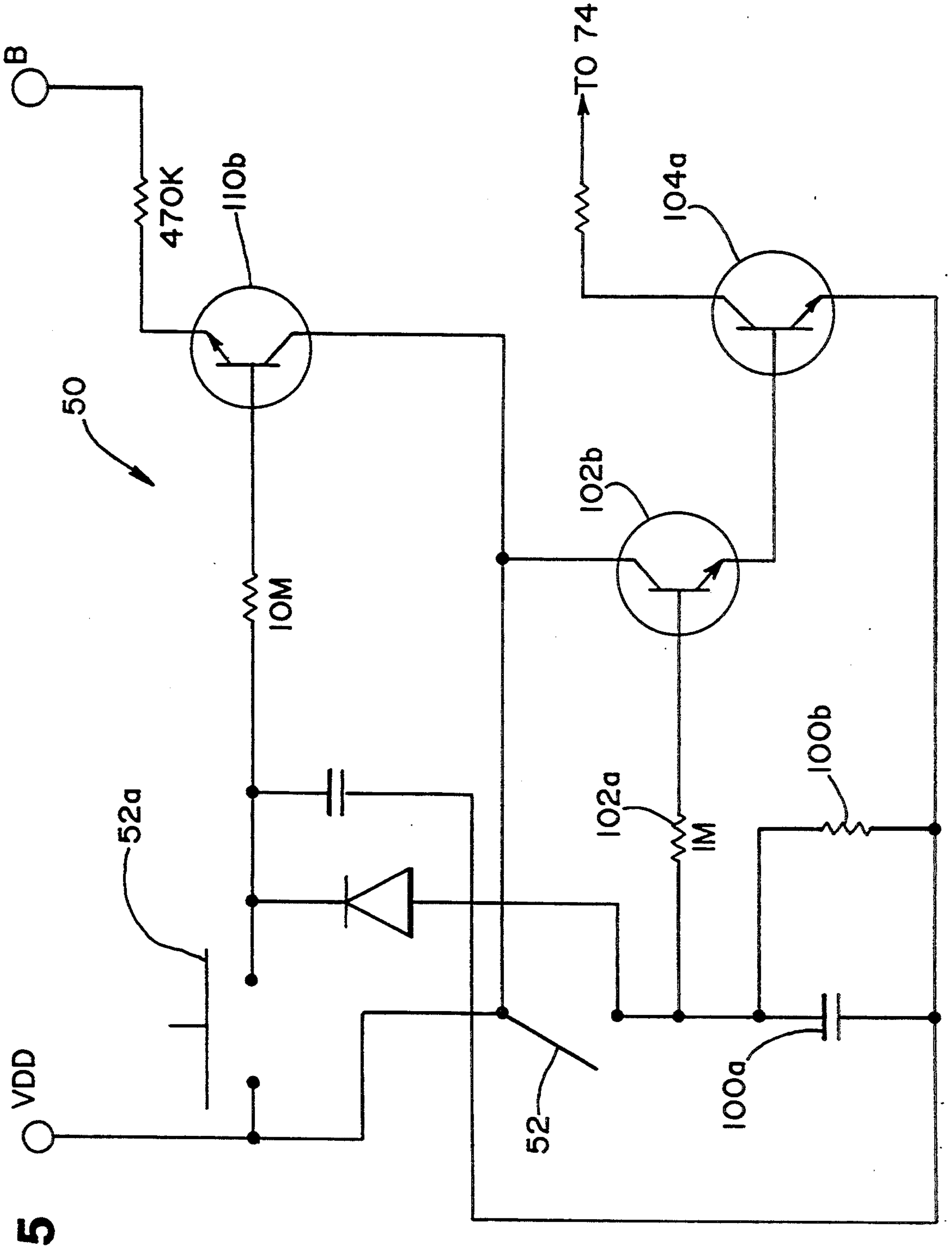
FIG. 5 is a schematic diagram of pulse energy level altering silencing circuitry in accordance with the present invention.

FIG. 5 is a schematic diagram of a circuit for altering the energy level of pulses generated by the source 12 for the purpose of reducing the sensitivity of the unit 10. As discussed previously, the circuitry 50 would used as an alternate to the bias altering circuitry 40 of FIG. 3.

The switch 52, which initiates the reduced sensitivity time interval, is coupled to RC time constant circuitry, including a capacitor 100*a* and an associated resistor 100*b*. The switch 52 is also coupled to a current limiting resistor 102*a*, which is turn is coupled to the base of a switching transistor 102*b*.

An emitter of the transistor 102*b* is in turn coupled to a base of a second switching transistor 104*a*. A collector at the transistor 104*a* via a resistor 104*b*, is in turn couple to the line 74 of the source biasing circuit 70.

When the switch 52 is closed, the resistor capacitor circuitry 100*a*, 100*b*, is charged up, thereby turning on transistors 102*b* and 104*a*. As a result, current is drawn from the line 74, via the resistor 104*b*.

This withdrawn current reduces the base drive to the switching transistor 68, thereby reducing the extent to which that transistor is turned on. As a result, the amplitude of the current flowing in the source 12 is reduced, thereby reducing the amplitude of energy supplied to the source 12 during the 200 microsecond intervals, when the transistor 68 is conducting. The output radiant energy R' from the source 12 is reduced, thereby reducing the sensitivity of the detector.

Figure 6:
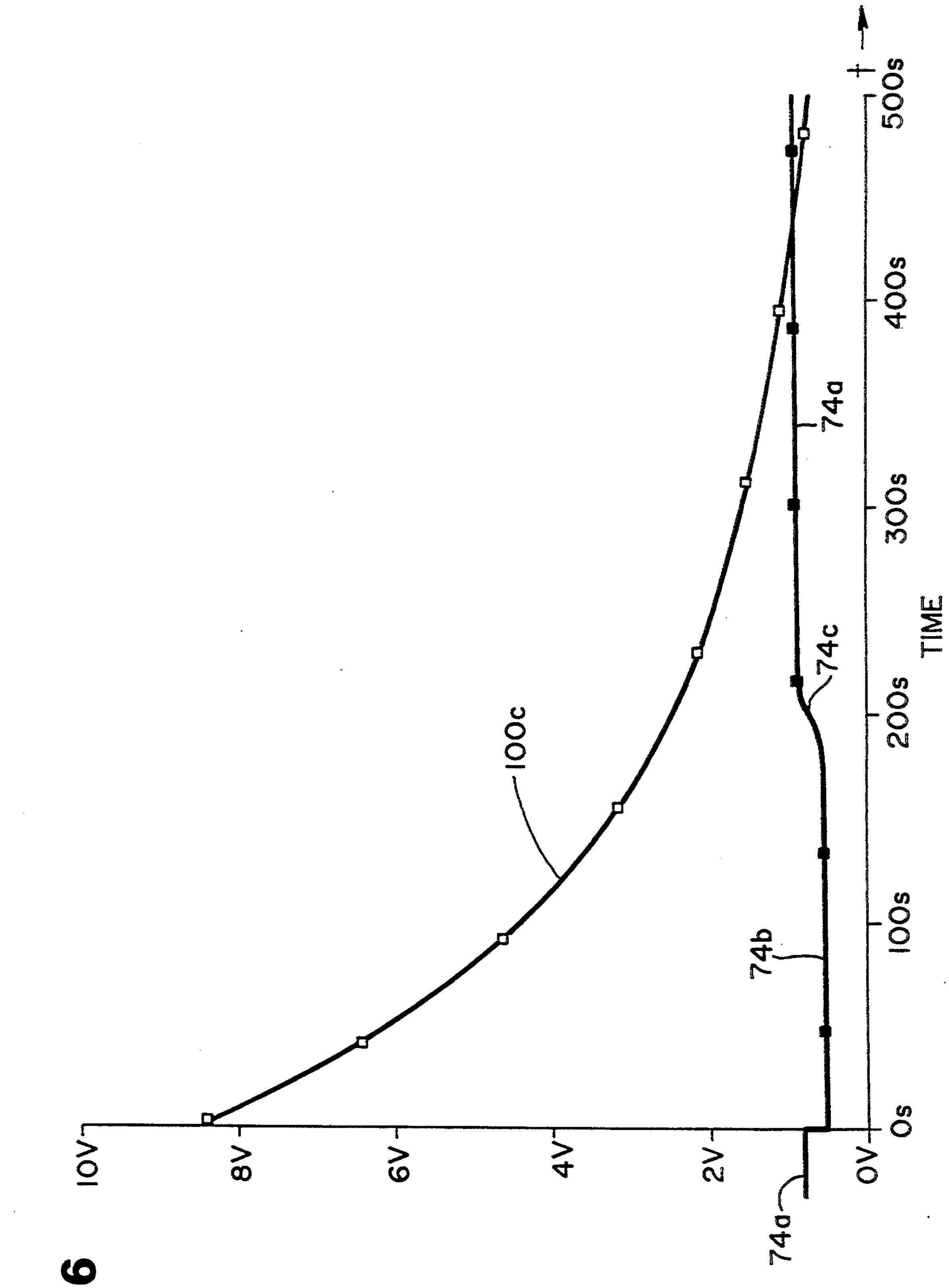
FIG. 6 is a graph of selected waveforms from the circuitry of FIG. 5.

FIG. 6 is a graph of a waveform 100*c* across the capacitor 100*a* during the silencing period, as well as the voltage 74*a*, 74*b* on the line 74 during the silencing period.

When the switch 52 is closed, at time equals zero seconds, the voltage 74*a* on the line 74, drops to a value 74*b*, due to the transistor 104*a* starting to conduct. As described previously, the transistor 104*a* starts to conduct because the voltage 100*c* across the capacitor 100*a* has been charged up to a peak value in excess of 8 volts. This voltage then holds the transistors 102*b* and 104*a* in a conducting state during the time that it is discharging.

As illustrated in FIG. 6, the voltage 74*b* on the line 74, is reduced during the silencing period which extends on the order of 190 seconds from the initial switch closure. At the end of this period of time, the voltage on the capacitor 100*a* has declined in value, such that transistors 102*a* and 104*a* are conducting at a reduced level.

During a transition period 74*c*, as the transistor 102*b* continues to turn off, the voltage on the line 74 increases and reverts to its higher steady state voltage value. During this time, the unit 10 returns to its normal level of sensitivity.

In FIG. 3, as oscillator speed-up transistor 11*a*, turned on by the voltage 84*d*, is used to speed up response of the detector 10 during the silencing period. A similar transistor 110*b* is also provided in the circuit 50 of FIG. 5. Further, a test switch 52*a* is provided for manual testing of the detector 10.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

I claim:

1. A condition detecting unit with an alterable sensitivity parameter usable to temporarily silence a unit which has generated an undesirable alarm, the unit comprising:

a condition detector including an energizable source of electromagnetic radiant energy and a biasable sensor of radiant electromagnetic energy;

circuitry, coupled to said source, for intermittently energizing same to emit discrete quantities of electromagnetic radiant energy;

circuitry coupled to said sensor, for biasing same to convert received radiant energy into an electrical signal;

am activation element; and sensitivity altering circuitry, coupled to and responsive to said element, for temporarily altering a sensitivity parameter of said detector so as to temporarily silence the unit for a predetermined period of time wherein said altering circuitry includes one of, circuitry for changing said bias of said sensor for said predetermined period of time so as to reduce said electrical signal for said predetermined period of time, or circuitry for altering said energization of said source for said predetermined period of time so as to reduce said emitted radiant energy for said predetermined period of time wherein said altering circuitry includes at least one switching element for carrying out said reducing function with a resistor-capacitor timing circuit coupled thereto to establish said predetermined period of time.

2. A condition detecting unit as in claim 1 wherein said biasing circuitry supplies a first biasing current to said sensor and wherein said bias changing circuitry includes timing circuitry for altering said first current for a predetermined of time.

3. A condition detecting unit as in claim 1 wherein said bias altering circuitry includes circuitry for increasing a voltage applied to said sensor for said predetermined period of time.

4. A condition detecting unit as in claim 1 wherein said energizing circuitry provides electrical energy at a first level to said source and wherein said energization altering circuitry includes circuitry for changing said energy level for a predetermined period of time.

5. A condition detecting unit as in claim 4 wherein said energy level changing circuitry includes circuitry for reducing said energy level for said predetermined period of time.

6. A condition detecting unit as in claim 1 wherein said activation element includes a manually operable member.

* * * * *